United States Patent

[11] 3,593,567

[72] Inventor Ezra D Hartley
 2700 Jalmia Drive, Los Angeles, Calif. 90046
[21] Appl. No. 831,288
[22] Filed June 9, 1969
[45] Patented July 20, 1971

[54] LEAK CHECKER
 12 Claims, 2 Drawing Figs.
[52] U.S. Cl. ................................................ 73/40
[51] Int. Cl. .............................................. G01m 3/28
[50] Field of Search .......................... 73/40, 40.5, 4; 137/494

[56] References Cited
 UNITED STATES PATENTS
 2,310,974  2/1943  Lumm .......................... 73/4
 2,478,938  8/1949  Osterhus ....................... 73/4
 3,089,331  5/1963  Sharko et al. ................. 73/4
 3,365,928  1/1968  Andersen, Jr. ................ 73/4

Primary Examiner—Louis R. Prince
Assistant Examiner—William A. Henry, II
Attorney—Smyth, Roston and Pavitt ABSTRACT: A leak checker for checking the static and pitot pressure systems of an aircraft for leaks which has first and second conduit means connectable respectively to the static and pitot pressure systems of the aircraft and a control valve for limiting the rate of evacuation or pressurization of the static pressure system. An indicator is operatively coupled to one of said conduits for providing an indication of leakage into or out of the pressure system. The checker also includes a valve limiting the maximum differential pressure between the two conduits and to prevent the pressure in the first conduit from substantially exceeding the pressure in the second conduit.

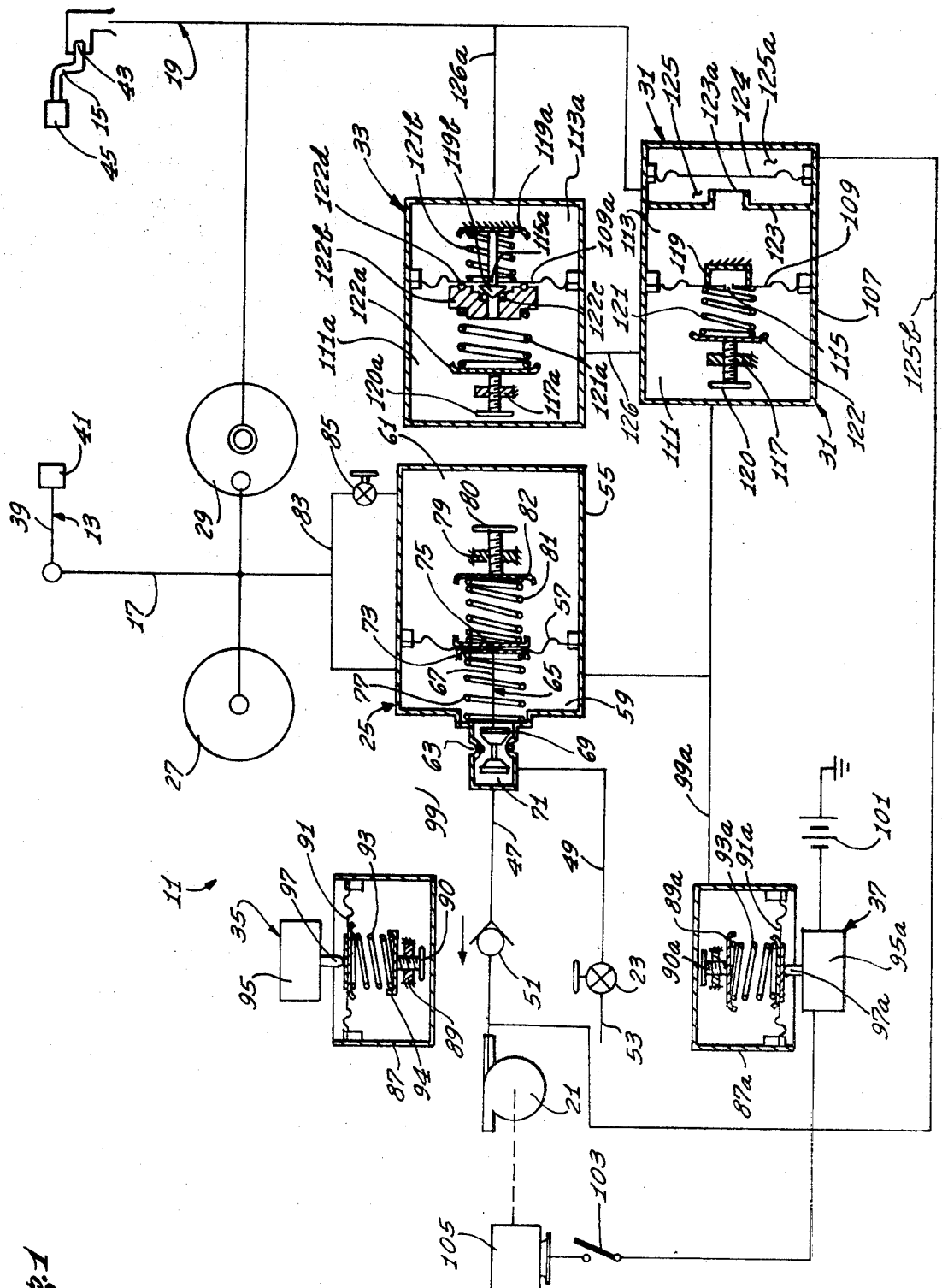

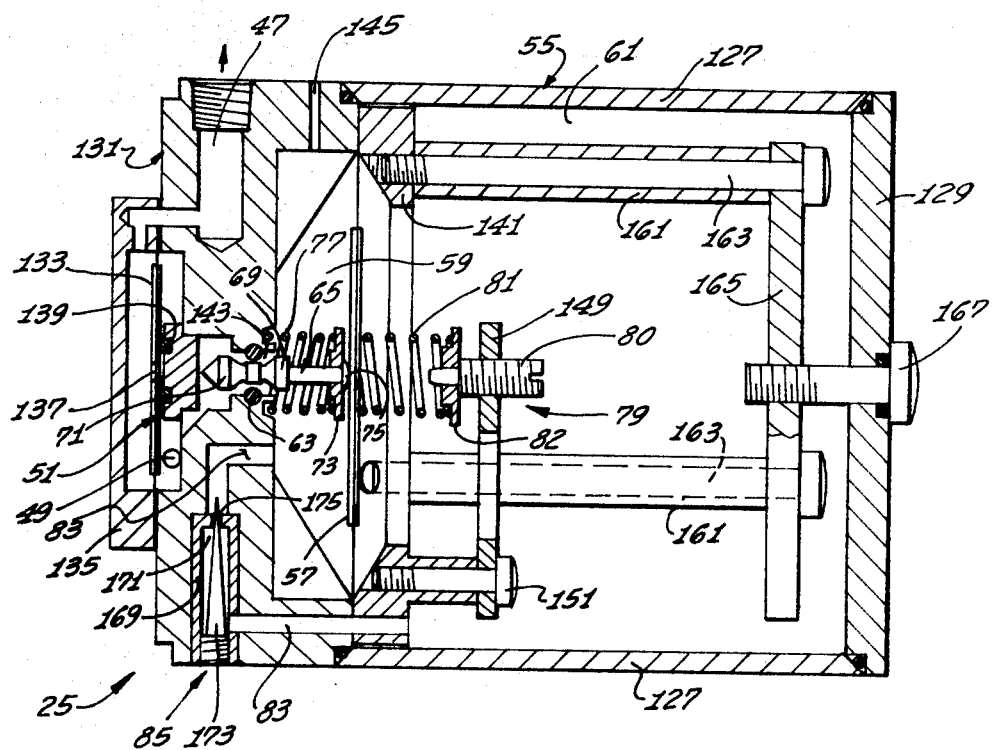

LEAK CHECKER

BACKGROUND OF THE INVENTION

Proper functioning of the altimeter and airspeed indicator of an aircraft is essential to the safe operation of the aircraft. The altimeter and airspeed indicator are responsive to static pressure and velocity pressure, respectively. Each time an airplane lands, it is required that both the static and pitot pressure systems of the aircraft be tested to assure that there are no leaks or that any leaks therein are within the acceptable limits.

The test is accomplished by connecting an appropriate leak checker to the static and total pressure or pitot outlets of the aircraft. One of these prior art leak checkers is manually operated and includes several needle valves. One problem with this checker is that it is operator dependent and requires a skilled technician. Being operator dependent, this prior art leak checker is also subject to operator error which can result in inaccurate test results or in damage to the delicate pressure instruments of the aircraft. A second prior art device functions more automatically than the first; however, it requires a skilled technician to operate it and it is extremely expensive.

To test the aircraft pressure systems, the static pressure system is evacuated to thereby simulate the conditions in the static pressure system during flight of the aircraft at a given altitude. Typically, the static pressure system is evacuated to provide subatmospheric pressure corresponding to an altitude of 24,000 feet. At this simulated altitude, the aircraft altimeter reading is checked against an accurately calibrated altimeter on the leak checker and any loss of the vacuum within the system over a given time limit indicates the nature of any leak in the system. Similarly, an airspeed indicator on the leak checker is connected between the static and pitot pressure systems and the differential pressure therebetween is measured.

Each aircraft has an instrument which measures the rate of ascent or descent of the aircraft. Because of the delicate nature of this instrument, the rate of ascent or descent must be within predetermined limits or this instrument will be damaged. As applied to the testing operation, this means that the rate of evacuation or pressurization of the static pressure system must be limited to avoid damage to this delicate instrument. On the other hand, it is desirable to bring the pressure systems in the aircraft to the desired vacuum pressure as rapidly as possible and then allow the pressure systems to become pressurized as rapidly as the rate of climb instrument on the aircraft will permit.

The typical rate of climb instrument can withstand a maximum altitude change of about 5,000 to 6,000 feet per minute without damage. As atmospheric pressure does not decrease linearly with an increase in altitude, the maximum change in static pressure which the rate of climb instrument can withstand is a variable which depends upon the simulated altitude of the aircraft pressure system. Thus, optimizing the rate of evacuation or pressurization of the aircraft static pressure system is not a simple matter of providing a constant rate of pressurization or evacuation. Heretofore complex and expensive electronic systems have been used in an effect to evacuate and pressurize the aircraft pressure systems as rapidly as permitted by the rate of climb instrument.

SUMMARY OF THE INVENTION

The present invention tests the static and pitot pressure systems of the aircraft very rapidly and accurately. The leak checker of this invention is not dependent upon the volume of the pressure systems which it is testing and therefore, a single leak checker can be utilized to test the pressure systems of different aircrafts having different pressure system volumes.

The present invention provides a structurally simple and inexpensive rate of climb control or a control valve which automatically controls the rate of evacuation and pressurization of the aircraft pressure systems. The control valve automatically permits evacuation and pressurization of the aircraft pressure systems at the maximum rate acceptable to the rate of climb instrument of the aircraft to thereby accomplish the test as rapidly as possible. Stated differently, the present invention causes the pressure in the aircraft static pressure system to change at a variable rate corresponding to the rate of pressure change with constant changes in altitude.

A conduit is connected to the static pressure system of the aircraft and a vacuum pump is provided for evacuating the static pressure system. The control valve includes a valve element in the conduit for controlling flow therethrough and a metering chamber or control chamber connected to the conduit to permit flow of air between the conduit and the chamber. The rate of airflow into and out of the control chamber is controlled as by an orifice or restriction. Thus, air is bled into and out of the control chamber over a time interval.

The valve element is controlled by the pressure differential across the restriction or between the control chamber and a location in the conduit on the same side of the valve element as the connection of the control chamber to the conduit. An increase in the differential pressure results in the movement of the valve element toward a closed position. Thus, a change in pressure conditions resulting in an increase in the differential pressure causes the valve element to move toward the closed position until sufficient air has bled into or out of the control chamber to reduce the differential pressure with resultant additional opening of the valve element. In this manner the maximum rate of flow through the conduit is limited.

In a preferred form of the invention, the control valve includes a housing with a movable member in the form of a diaphragm dividing the housing into a flow chamber and a control chamber. The diaphragm moves in response to the pressure differential existing in the two chambers to thereby control the position of the valve element. The valve element is drivingly connected to the diaphragm and controls the flow of air through the flow chamber which forms a portion of the conduit which is connected to the static pressure system of the aircraft. The control chamber is connected to the conduit or the flow chamber and a needle valve suitably restricts the flow of fluid between the conduit and the control chamber. The valve element is normally biased toward a neutral or open position and is connected to the diaphragm.

Thus, the flow of fluid between the control chamber and the conduit controls the position of the valve element in that diaphragm movement is dependent upon flow of the compressible fluid into or out of the control chamber. For this reason, the orifice size must be calculated in relation to the control chamber volume. Although the specific calculations can be made by one skilled in the art, generally orifice size should increase with an increase in control chamber volume.

The differential pressure acting on the valve element is made negligible by making diaphragm area very large in relation to valve element area. For example, the effective area of the diaphragm may be 600 times the effective area of the valve.

In order to make the operation of the leak checker independent of the volume of the pressure system being tested, the restriction or the orifice should lie intermediate the aircraft system and the control chamber. Although the leak checker would function if the restriction were placed anywhere between the flow chamber and the static pressure system, with the control chamber not isolated but part of the static pressure system, the leak checker becomes dependent upon system volume unless the orifice is positioned between the aircraft system and the control chamber.

The pressure drop across the restriction should be sufficiently low so that density changes of the air should be negligible on the volumetric flow rate across the restriction. For example, the restriction may have a pressure drop of 2 to 3 inches of water so that the compressibility factor is negligible.

In summary, the valve element position is a function of the pressure differential across the diaphragm. The restriction makes possible the pressure differential across the diaphragm by preventing the control chamber from instantaneously reaching flow chamber pressure. The restriction also allows and controls flow between the control chamber and the flow chamber to thereby tend to equalize the pressure in these chambers. The diaphragm, however, in response to a drop in pressure differential thereacross opens the valve element to reestablish the pressure differential across the diaphragm.

It has been found that this arrangement controls the valve element so that the aircraft static system can be evacuated or pressurized at a rate substantially corresponding to the rate of pressure change for a constant rate of altitude change. The rate of change of altitude is determined by the flow across the orifice which is adjustable by adjusting the needle valve.

In running the test of the pressure systems, it is desirable to limit the maximum airspeed, i.e., the maximum pressure differential between the velocity and static systems. According to the present invention, a second conduit is connected to the velocity pressure system of the aircraft and an airspeed indicator is connected across the two conduits to provide an indication of differential pressure or airspeed. A maximum airspeed valve interconnects the two conduits, and this valve is responsive to a first predetermined differential pressure between the two conduits to permit air to be bled from the second conduit into the first conduit.

It is, of course, impossible during actual flight for an aircraft to have negative airspeed and the instruments of the aircraft are designed so that the pressure conditions resulting in any significant negative airspeed would damage some of the instruments. During testing, however, a negative airspeed would be indicated in the event that the pressure in the static system were to exceed the pressure in the pitot system and to prevent this from occurring the present invention provides a negative airspeed valve between the two conduits. This valve opens whenever the pressure in the pivot system approaches the pressure in the static system to thereby equalize the pressure in the two systems and prevent a negative airspeed indication.

The maximum airspeed valve is operative only when the vacuum pump is running. The negative airspeed valve is preferably double acting to allow air to flow from the pitot to the static system in response to a pressure differential of greater magnitude than the first pressure differential. Thus, with the pump shut off and the test being run a leak into the pitot system can be measured without having the maximum airspeed valve open to drain some air into the static system.

Although the invention described herein is described with reference to a leak checker for aircraft pressure systems, it will be apparent to those having ordinary skill in the art that this invention may be employed in various environments where limitation of the flow of a compressible fluid through a conduit is required. Similarly, the control valve of this invention may have uses independent of the specific embodiment illustrated herein.

The invention, both as to its organization and method of operation together with further features and advantages thereof may best be understood by reference to the following description taken in connection with the accompanying drawings.

BRIEF DESCRIPTION OF THE DRAWINGS

FIG. 1 is a schematic view of a leak checker constructed in accordance with the teachings of this invention.

FIG. 2 is an axial sectional view through one form of control valve constructed in accordance with the teachings of this invention.

DESCRIPTION OF THE PREFERRED EMBODIMENTS

Referring to the drawing and in particular to FIG. 1 thereof, reference numeral 11 designates a leak checker constructed in accordance with the teachings of this invention. The leak checker 11 is utilized to check a static pressure system 13 and a velocity pressure or pitot system 15 for an aircraft (not shown).

Generally, the leak checker 11 includes conduits 17 and 19 connectable respectively to the static pressure system 13 and to the pitot system 15. The static pressure system 13 can be evacuated by a vacuum pump 21, and the static pressure system 13 can be returned to ambient pressure by a manually operated valve 23 which is exposed at one end to ambient atmosphere.

The rate of airflow in either direction through the conduit 17 is controlled by a rate of climb control or a control valve 25. A static pressure gauge or altimeter 27 measures the static pressure in the conduit 17 and a differential pressure indicator or airspeed indicator 29 measures the airspeed or the pressure differential between the conduits 17 and 19. An airspeed limiting valve 31 is interconnected between the conduits 17 and 19 to limit the maximum differential pressure between the two conduits. A negative airspeed valve 33 is also connected between conduits 17 and 19 to prevent the pressure in the conduit 17 from exceeding the pressure in the conduit 19. The leak checker 11 also includes pressure switches 35 and 37.

The static pressure system 13 of the aircraft typically includes a conduit 39 having one end open to the atmosphere and shielded from the effects of aircraft airspeed and instruments 41 connected to the conduit. The instruments 41 typically include, among other things, a pressure transducer and an altimeter with the altimeter being responsive to the static pressure sensed by the system 13 to indicate the altitude of the aircraft. The pitot system typically includes a pitot tube 43 inserted into the airstream adjacent the aircraft for sensing total pressure and instruments 45 which may include a pressure transducer and an airspeed indicator with the airspeed being a function of the velocity pressure.

The control valve 25 is connected to the static pressure system 13 by the conduit 17 and to the pump 21 and the valve 23 by conduits 47 and 49, respectively. A check valve 51 is provided in the conduit 47 to assure that all flow through that conduit will be toward the vacuum pump 21. The valve 23 may be a manually operated valve having a port 53 which leads to ambient atmosphere. Thus, by opening the valve 23, the conduit 17 and the system 13 can be provided with ambient air to pressurize the system 13. With the valve 23 closed and the pump 21 operating, the pump evacuates the system 13 and the conduit 17.

The flow of air through the conduit 17 in either direction is controlled by the control valve 25. The control valve 25 includes a housing 55 having a movable member in the form of a diaphragm 57 mounted therein and dividing the housing into a flow chamber 59 and a metering or control chamber 61. The flow chamber 59 forms, in effect, a portion of the conduit 17 and is connected to the conduits 47 and 49 as shown in FIG. 1. The flow chamber 59 has a valve seat 63 formed therein.

A valve element 65 which includes a stem 67 and a pair of axially spaced heads 69 and 71 is mounted for movement in the flow chamber 59. A collar 73 is slidably mounted on the stem 67 and retained thereon by a flange 75. A coil spring 77 acts between the housing and the collar 73 to urge the valve element to the right as shown in FIG. 1.

The housing 55 provides a fixed support 79 in the control chamber 61 and an adjusting screw 80 is screwed into the support 79. A coil spring 81 acts between the right face of the diaphragm 57 and a collar 82 on the screw 80 to urge the diaphragm to the left as viewed in FIG. 1. In the embodiment illustrated, the springs 77 and 81 serve as centering springs in that they move the valve element 65 to a neutral position in which the enlarged heads 71 and 69 are spaced equal distances from the valve seat 63 and in which the control valve 25 is opened the maximum amount in that the restriction afforded by the valve element 65 to fluid flow through the flow chamber 59 is at a minimum. The springs 77 and 81 are preferably of equal strength and have the same spring rate. Although the valve element 65 may be designed to accomplish various objectives, it is important that a predetermined amount of movement in either direction from the neutral position will result in a reduction in the flow area at the valve seat 63, i.e., the valve will begin closing to reduce the quantity of fluid flowing therethrough. The valve also has a fully closed position in which either of the heads 69 and 71 are sealingly seated on the valve seat 63. The screw 80 can be used to adjust the spring force on the diaphragm 57.

A conduit 83 connects the conduit 17 with the control chamber 61. A flow restriction in the form of a needle valve 85 is located in the conduit 83 to thereby reduce the rate of flow of air between the conduit 17 and the control chamber 61. By using the needle valve 85 the amount of the restriction can be varied as desired. The restriction provided should be sufficient so that the control chamber 61 cannot be instantaneously evacuated or pressurized through the conduit 83.

Assuming that the system 13, the conduit 17 and the chambers 59 and 61 are at atmospheric pressure, starting of the vacuum pump 21 will reduce the pressure in the conduit 47 and in the flow chamber 59 as the valve element 65 is normally in the open position. However, any pressure reduction in the flow chamber 59 does not immediately result in a corresponding pressure drop in the control chamber 61 because of the restriction to flow afforded by the needle valve 85. Accordingly, there is a pressure differential across the diaphragm 57 and such differential is effective to move the diaphragm 57 and the valve element 65 to the left against the resistive biasing action of the spring 77. The valve element 65 moves to a closed or partially closed position immediately after starting of the pump 21.

Gradually, the air in the control chamber 61 bleeds through the orifice provided by the needle valve 85 into the flow chamber 59 to effect a pressure reduction within the control chamber. An incremental pressure drop in the control chamber 61 results in an incremental reduction in the differential pressure across the diaphragm 57. This causes the valve element 65 to move toward or to the full open position. Such incremental opening of the valve element 65 results in a greater exposure of the flow chamber 59 to the vacuum upstream of the valve element to thereby effect a further pressure reduction in the flow chamber. In this manner the valve smoothly and repeatedly moves in on-off fashion to control the evacuation of the system 13.

The volume of air flow through the needle valve 25 in any given time period remains substantially constant. However, because the density of the air changes with pressure, the mass flow rate is a variable with the mass flow rate decreasing with a decrease in air pressure.

By appropriately selecting the opening size through the needle valve 85, the pressure drop in the conduit 17 will closely approximate the pressure drop in the system 13 as a result of the aircraft ascending at a preselected constant rate. This is the most desirable rate of evacuation because the delicate rate of climb instrument has a maximum rate of climb which cannot be exceeded without damaging the instrument. Thus, by causing the pressure drop in the system 17 to approximate the rate at which the pressure would drop if the airplane were ascending at a predetermined constant rate slightly less than the allowable rate of ascent of the instrument, damage to the latter can be avoided.

When the system 13 has been evacuated to the extent desired, the readings on the altimeter 27 and airspeed indicator 29 are noted for a predetermined time interval following which the valve 23 is opened to allow pressurization of the conduit 17 and the system 13. In controlling the pressurization of the conduit 17, the control valve 25 functions in a manner opposite to that described above in that the flow chamber 59 contains relatively high pressure and the control chamber 61 contains relatively low pressure. Accordingly, the differential pressure acting on the diaphragm 57 moves the diaphragm 57 to the right as viewed in FIG. 1 thereby permitting the spring 77 to move the valve element 69 to the right to cause the head 71 to close off airflow into the conduit 17. During pressurization, fluid bleeds past the needle valve 85 into the control chamber 61 to thereby control the position of the valve element 65 and the rate at which the conduit 17 and the system 13 are pressurized.

The particular sizes of the components of the control valve 25 can be varied to suit the results desired. In one embodiment of the valve 25, the metering chamber 61 has a volume of about 42 cubic inches, the effective area of the diaphragm 57 is about 7 square inches, the effective area of each of the heads 69 and 71 is about 0.005 square inch, and the pressure drop across the needle valve 85 is about 2½ inches of water.

The pressure switch 35 is provided for the purpose of turning on a warning light at the static pressure which exists at an altitude of approximately 100 feet above ambient altitude. Although the pressure switch 35 may be embodied in many different forms, in the embodiment illustrated, it includes a housing 87 which has a rigid support 89 therein. An adjusting screw 90 is screwed into the support 89. One end of the housing 87 is closed by a diaphragm 91 and a spring 93 acts between a collar 94 on the screw 90 and the diaphragm 91. A microswitch 95 has the actuating button 97 thereof in engagement with the diaphragm 91 in a position to be operated thereby. The housing 87 is connected by a conduit 99 to the flow chamber 59 so that the housing 87 is kept at flow chamber pressures.

When the static pressure in the housing 87 is approximately equal to the static pressure at an altitude of 100 feet, the pressure acting on the inner face of the diaphragm plus the force of the spring 93 is sufficient to actuate the microswitch 95 to turn on an appropriate warning light indicating that such altitude has been reached. When the pressure drops below this value, the ambient air pressure acting on the exterior of the diaphragm 91 is sufficient to return the diaphragm to the position shown in FIG. 1 in which the microswitch turns the light off.

The pressure switch 37 is identical to the pressure switch 35 except as specifically noted herein and portions of the pressure switch 37 corresponding to the pressure switch 35 are designated by corresponding reference characters followed by the letter a. The housing 87a is maintained at the same pressure as the flow chamber 59 by a conduit 99a. Initially, with equal pressures acting on both faces of the diaphragm 91a, the microswitch 95a completes a circuit from a power source such as a battery 101 through a manual switch 103 to a motor 105 which drives the pump 21. As the system 13 is evacuated and the pressure within the housing 87a drops, the diaphragm 91a moves upwardly until the microswitch 95a is allowed to open to break the circuit to the motor 105 thereby stopping the pump 21. This can occur at any preselected altitude such as 24,000 feet.

During pressurization of the system, the housing 87a pressurizes with resultant downward movement of the diaphragm 91a. The microswitch 95a is adjusted so that at a pressure equivalent to, for example, an altitude of 700 feet, the microswitch closes to start the motor 105. Thus, the test will be automatically rerun unless the operator opens the manual switch 103.

It is desirable to limit the airspeed or the differential pressure between the conduits 17 and 19, and this function is accomplished, while the pump 21 is running, by the valve 31 which includes a housing 107 having a diaphragm 109 therein dividing the housing into chambers 111 and 113. The chambers 111 and 113 are connected to the conduits 17 and 19, respectively. The diaphragm 109 has an aperture 115 therein. Rigid supports 117 and 119 are provided within the chambers 111 and 113, respectively. An adjusting screw 120 is screwed into the support 117. A coil spring 121 acts between the diaphragm 109 and a collar 122 on the screw 120 to urge the diaphragm against the support 119. The support 119 forms, in effect, a valve seat which seals off the aperture 115 in the position of the valve shown in FIG. 1.

Normally, the spring 121 has sufficient strength to urge the diaphragm 109 into sealing engagement with the valve seat 119. However, should the pressure in the chamber 113 exceed the pressure in the chamber 111 by a predetermined amount, such differential pressure would be sufficient to move the diaphragm 109 to the left to thereby permit fluid to flow through the aperture 115 into the chamber 111 and from there to the flow chamber 59. Although the differential pressure setting at which the valve 31 opens can be varied to suit particular requirements, in the embodiment illustrated, the valve 31 opens when the pressure in the chamber 113 exceeds by 4.5 inches of mercury the pressure in the chamber 111. This pressure differential is approximately equivalent to an airspeed of approximately 300 knots.

The valve 31 has a wall 123 defining a valve seat 123a with the valve seat having an aperture therethrough. A second diaphragm 124 divides the region of the housing 107 between the wall 123 and the end wall of the housing into a pitot pressure chamber 125 and a vacuum pressure chamber 125a. The vacuum pressure chamber 125 is connected by a conduit 125b to a region between the intake of the pump 21 and the check valve 51.

When the vacuum pump 21 is operating, the vacuum chamber 125a is at a sufficiently low pressure so that the diaphragm 124 is out of contact with the valve seat 123a as shown in FIG. 1. Thus, fluid from the conduit 19 can flow into the chamber 113 to act in the diaphragm 109. However, when the pump 21 is shut off, the conduit 125b and other conduits to the left of the check valve 51 are returned to standard atmospheric pressure automatically through the pump 21. This relatively high pressure acts on the diaphragm 124 and urges it to the left into sealing engagement with the valve seat 123a to thereby isolate the chamber 113 from the pressure of the fluid in the conduit 19. This renders the valve 31 incapable of passing fluid from the conduit 19 to the conduit 17. Thus, the valve 31 is operative only when the pump 21 operates and thereafter is automatically rendered inoperative.

The valve 33 includes a housing 107a having a diaphragm 109a therein dividing the housing into chambers 111a and 113a. The chambers 111a and 113a are connected by conduits 126 and 126a to the chamber 111 and the conduit 19. The diaphragm has an aperture 115a therein. Rigid supports 117a and 119a are provided within the chambers 111a and 113a, respectively. An adjusting screw 120a is screwed into the support 117a. A coil spring 121a acts between a collar 122a on the screw 120 and a movable valve element 122b. The support 119a has a valve seat 119b which projects through the aperture 115a. The valve element 122b in the position shown in FIG. 1 sealingly engages a seal 122c carried by the valve seat 119b. The diaphragm 109a in the position shown in FIG. 1 is urged into sealing engagement with a seal 122d carried by the valve element 122b by a spring 121b.

In the position shown in FIG. 1, the valve 33 is closed and flow between the chambers 111a and 113a in either direction is prevented. Should the pressure in the static system 13 and therefore in the chamber 111a exceed the pressure in the conduit 19 and therefore in the chamber 113a by any significant amount, the fluid pressure within the chamber 111a acting in the diaphragm 109a forces the diaphragm off of the seal 122d against the force of the spring 121b to permit flow of air from the chamber 111a to the chamber 113a. In this manner, the valve 33 prevents a negative airspeed condition.

The second function of the valve 33 is to limit the maximum airspeed or the maximum amount which the pressure in the conduit 19 can exceed the pressure in the conduit 17. The valve 33 is openable to permit fluid flow from the conduit 19 to the conduit 17 at a pressure differential which exceeds the pressure differential at which the valve 31 opens. The primary purpose for this is to facilitate testing of the system. Thus, without the valve 33 and with the valve 31 operative with the pump shut down, a leak of atmospheric air into the evacuated pitot system 15 would result in opening of the valve 31 and bleeding of the leakage air into the static system 13. To avoid this, the valve 31 is rendered inoperative by the discontinuance of operation of the pump 21 as described hereinabove and the valve 33 opens at a pressure differential which would exist, for example, at 350 knots. The valve 33 opens when the pressure build up in the chamber 113a and the force of the spring 121b are sufficient to urge the valve element 122b off of its seat 119b. In this manner, a period of time is provided during which the operator can observe the extent to which air may be leaking into the pitot system 15.

In operation of the system, the switch 103 is closed to energize the motor 105 to activate the pump 21. This causes the evacuation of the conduit 17, the system 13 and the chambers 59, 87, 87a, 111 and 113a. The conduit 19 and the pressure system 15 should remain at substantially atmospheric pressure. As the system 13 is evacuated, the altimeter 27 will indicate the extent to which the system is evacuated and the airspeed indicator 29 will give an airspeed reading which is a function of the difference in pressure between the conduits 17 and 19. When the pressure differential between the conduits 17 and 19 reaches approximately 4.5 inches of mercury, the valve 31 opens and thereafter, the conduit 19 and the system 15 is evacuated at a rate which will substantially maintain the differential pressure of 4.5 inches of mercury.

When the system 13 is evacuated to the extent desired, for example, to the pressure existing at an altitude of 24,000 feet, the pressure within the housing 87a of the switch 37 is reduced sufficiently to automatically open the microswitch 95a and turn off the motor 105 to stop the pump 21. This causes deactivation of the valve 31 as described hereinabove. At this point, the readings on the altimeter 27 and the airspeed indicator are noted and compared with the corresponding readings of the corresponding indicators of the aircraft. The system is allowed to remain in the evacuated condition for an interval of time to determine to what extent, if any, the vacuum pressures in the systems 13 and 15 will be lost.

When the necessary tests have been completed, the valve 23 is opened any desired amount to commence pressurizing the system 13. The control valve 25 controls the rate of pressurization of the system 13 as described hereinabove. As the pressure within the chamber 111a of the valve 33 increases, it will eventually become sufficient to open the valve 33 to thereby permit pressurization of the conduit 19 and the system 15. Thereafter the system 15 and the conduit 19 are pressurized at substantially the same rate as the conduit 17.

When the systems 13 and 15 are pressurized to an altitude of about 700 feet, the microswitch 95a is closed to start the motor 105 to repeat the test unless of course the manual switch 103 has been opened. At an altitude of approximately 100 feet, the microswitch 97 deenergizes a warning light to advise the operator that the test is nearing completion. When the operator sees the warning light turn off, he can safely disconnect the conduits 17 and 19 from the systems 13 and 15 and regard the test as completed.

FIG. 2 shows a preferred form of the control valve 25. In the form illustrated in FIG. 2 the housing 55 of the control valve includes a sleeve 127 and end members 129 and 131 suitably affixed to the sleeve to close the ends thereof. As shown, the conduits 47 and 49 are formed as passages in the end member 131 and the check valve 51 is also in the end member 131. The check valve 51 includes a diaphragm 133 the ends of which may be clamped between the end member 131 and a removable cap portion 135 which forms a removable portion of the member 131. The diaphragm 133 has a central aperture 137 therein. The check valve 51 has a valve seat 139 against which the diaphragm 133 seats in response to a higher pressure on the left side of the diaphragm than on the right side of the diaphragm.

The diaphragm 57 is clamped against the left annular end face of the member 131 by a clamping ring 141 which is suitably removably mounted on the member 131. As shown, the valve element 65 is in the form of a double poppet valve and the valve seat 63 is in the form of an O-ring suitably retained in a port 143 of the member 131. The member 131 also has ports 145 for connection to the conduit 17 and to the other components of the system.

In the embodiment illustrated, the support 79 includes an arm 149 mounted by a bolt 151 on the clamping ring 141. The adjusting screw 80 is mounted on the arm 149 and has a collar 82 rotatably affixed to one end thereof. The spring 81 acts between the collar 82 and the right face of the diaphragm 57 is viewed in FIG 2.

Although the end member 129 can be mounted on the sleeve 127 in any suitable manner, in the embodiment illustrated, a plurality of support rods 161 are mounted on the ring 141 by elongated bolts 163. The support rods 161 and the bolts 163 have a support plate 165 mounted thereon, and one or more bolts 167 project through the end member 129 and into the support plate 165 to thereby mount the end member 129 on the sleeve 127.

Although the needle valve 85 may be constructed and arranged in various manners, in the embodiment illustrated, it is provided in the member 131 with the conduit 83 being in the form of a passage extending from the control chamber 61 directly to the needle valve 85. In the embodiment illustrated, the needle valve 85 is of the tapered pintle type and includes body or housing 169 suitably mounted within the member 131 and having a passage 171 extending therethrough and communicating with the conduit 83. A tapered pintle 173 is threadedly mounted within the passageway 171, and by turning of the tapered pintle 173, the obstruction which it affords in an orifice portion 175 of the passageway 171 can be varied. In this manner, the effective area of the orifice or restriction can be set. The remainder of the conduit 83 is provided in the form of a port downstream of the needle valve 85.

Although an exemplary embodiment of the invention has been shown and described, many changes, modifications, and substitutions may be made by one having ordinary skill in the art without necessarily departing from the spirit and scope of this invention.

I claim:

1. A leak checker for checking the static and pitot pressure systems of an aircraft comprising:
   first and second conduits connectable respectively, to the static and pitot pressure systems of the aircraft;
   a pump connectable to the first conduit to evacuate said first conduit and said static pressure systems;
   means for admitting atmospheric air to said first conduit and said static pressure system to pressurize said first conduit and said static pressure system following the evacuation thereof;
   first valve means for limiting the maximum rate of evacuation and pressurization of said first conduit and said static pressure system;
   an indicator connectable to the first and second conduits and responsive to the pressure differential between said conduits;
   second valve means responsive to the operation of said pump for bleeding air from said second conduit to said first conduit in response to a first predetermined pressure differential during the evacuation of said first conduit, said second valve means including means responsive to a predetermined increase in pressure at the intake of said pump to prevent substantial flow of air from said second conduit to said first conduit through said second valve means; and
   third valve means responsive to a second pressure differential greater than said first pressure differential between said conduits to bleed air from said second conduit into said first conduit.

2. A leak checker as defined in claim 1 including means for bleeding air from said first conduit to said second conduit in response to the pressure in the first conduit exceeding the pressure in said second conduit.

3. A leak checker for checking the static and pitot systems of an aircraft comprising:
   first and second conduits connectable, respectively, to the static and pitot pressure systems of the aircraft;
   a pump connectable to the conduits to evacuate said conduits and said pressure systems;
   a control chamber connectable to said first conduit whereby said pump can evacuate said control chamber;
   first valve means responsive to the pressure in said control chamber for limiting the maximum rate of evacuation of said first conduit and said static pressure system;
   means for controlling the rate of evacuation of said control chamber to thereby effect the pressure of the air in said control chamber;
   an indicator connectable to the first and second conduits and responsive to the pressure differential between said conduits for providing an indication of leakage of at least one of the systems;
   means for limiting the maximum pressure differential between said conduits;
   means for preventing the pressure in said first conduit from substantially exceeding the pressure in said second conduit; and
   second valve means in said first conduit for admitting atmospheric air to said first conduit to pressurize the conduits and the systems, said means for limiting the maximum pressure differential includes third valve means responsive to operation of the pump to bleed air from the first conduit to the second conduit when the pressure differential between said conduit reaches a first predetermined magnitude, means responsive to discontinuance of pump operation for closing said third valve means, and fourth valve means for bleeding air from the first conduit to the second conduit when the pressure differential between said conduits reaches a second predetermined magnitude which is greater than said first predetermined magnitude.

4. A leak checker for checking the static and pitot systems of an aircraft comprising:
   First and second conduits connectable, respectively, to the static and pitot pressure systems of the aircraft;
   a pump connectable to the conduits to evacuate said conduits and said pressure systems;
   a control chamber connectable to said first conduit whereby said pump can evacuate said control chamber;
   first valve means responsive to the pressure in said control chamber for limiting the maximum rate of evacuation of said first conduit and said static pressure system;
   means for controlling the rate of evacuation of said control chamber to thereby effect the pressure of the air in said control chamber;
   an indicator connectable to the first and second conduits and responsive to the pressure differential between said conduits for providing an indication of leakage of at least one of the systems;
   means for limiting the maximum pressure differential between said conduits;
   means for preventing the pressure in said first conduit from substantially exceeding the pressure in said second conduit; and
   said first valve means includes a valve element in said first conduit for controlling the flow of fluid through said first conduit, means defining a restriction to permit bleeding of the fluid therethrough between said control chamber and said first conduit whereby a pressure differential can exist across said restriction, and means responsive to the pressure differential between said control chamber and a location in said first conduit for controlling the position of said valve element with the valve element providing an increased restriction to flow in response to an increase in the pressure differential.

5. A leak checker as defined in claim 4 wherein said means for limiting the maximum differential pressure includes second valve means for bleeding fluid from the second conduit to the first conduit in response to the differential pressure reaching a predetermined magnitude.

6. A leak checker as defined in claim 4 wherein said means for preventing includes means for bleeding air from said first conduit to said second conduit in response to the pressure in said first conduit approximating the pressure in said second conduit to thereby prevent the pressure in said first conduit from substantially exceeding the pressure in said second conduit.

7. A leak checker for fluid system comprising
a pump having an intake side and a discharge side;
a first conduit connectable to the fluid system, said conduit being connected to said pump so that said pump can pump fluid through the first conduit;
means defining a control chamber;
a second conduit providing communication between said control chamber and a location in said first conduit;
means defining a restriction in said second conduit so that the pump can pump fluid therethrough and create a pressure drop across said restriction;
valve means responsive to said pressure drop for controlling the rate of flow through the first conduit between the pump and the fluid system; and
indicator means operatively coupled to one of said conduits for providing an indication of leakage into or out of the fluid system.

8. A leak checker as defined in claim 7 wherein said location is on the same side of said pump as the fluid system.

9. A leak checker as defined in claim 7 wherein said valve means includes a valve member at least partially in said first conduit between said pump and the fluid system, said valve element being movable in response to said pressure drop for controlling the area of an opening in said first conduit to thereby control the flow of fluid through the first conduit between the pump and the fluid system.

10. A leak checker for a fluid system comprising:
a pump having an intake side and a discharge side;
a conduit connectable to the fluid system, said conduit being connected to said pump so that said pump can pump fluid through the conduit between the fluid system and the pump;
means defining a control chamber in communication with said conduit;
means defining a restriction between the pump and the control chamber so that the flow of fluid through said restriction creates a pressure drop;
valve means responsive to said pressure drop for controlling the rate of flow through said conduit between the pump and the fluid system, said valve means including a valve element positionable in a section of said conduit between said pump and said fluid system to control the opening afforded by said section to the passage of the fluid therethrough; and
indicator means operatively coupled to said conduit for providing an indication of leakage into or out of the fluid system.

11. A leak checker as defined in claim 10 wherein the fluid system has first and second sections, said first mentioned conduit being connectable to the first section, said leak checker including a second conduit connectable to the second section and means responsive to a predetermined pressure drop between said conduits for bleeding fluid from the second conduit into said first conduit.

12. A leak checker as defined in claim 10 including means defining a flow chamber, a diaphragm separating said flow chamber from said control chamber, and means for connecting said valve element to said diaphragm for movement therewith, said flow chamber being in communication with said conduit intermediate said pump and said restriction.